United States Patent [19]
Miller

[11] 3,889,275
[45] June 10, 1975

[54] STRIP CHART RECORDER
[75] Inventor: Roger L. Miller, Lansdale, Pa.
[73] Assignee: Leeds & Northrup Company, North Wales, Pa.
[22] Filed: June 17, 1974
[21] Appl. No.: 479,940

[52] U.S. Cl. ............... 346/136; 226/50; 226/113; 242/67.2
[51] Int. Cl.² ..................................... G01D 15/24
[58] Field of Search........ 346/136; 242/67.2, 67.3 R, 242/67.4; 226/50, 113

[56] References Cited
UNITED STATES PATENTS
2,034,543  3/1936  Twiss et al. ................... 346/136 X
2,059,879  11/1936  La Pierre ...................... 346/136 X Primary Examiner—Joseph W. Hartary
Attorney, Agent, or Firm—Philemon J. Moore; Raymond F. MacKay

[57] ABSTRACT

A strip chart recorder of the low profile type wherein a chart metering roll pulls chart from a supply roll, drives it past recording means, after which the chart is rewound on a reroll. The improvement comprising means which may be actuated in one sense automatically to extract chart from the reroll to form a loop of chart which is accessible for inspection so that earlier recorded portions may be readily reviewed and upon actuation in another sense the chart in the loop may be caused automatically to be rewound on the reroll.

7 Claims, 4 Drawing Figures

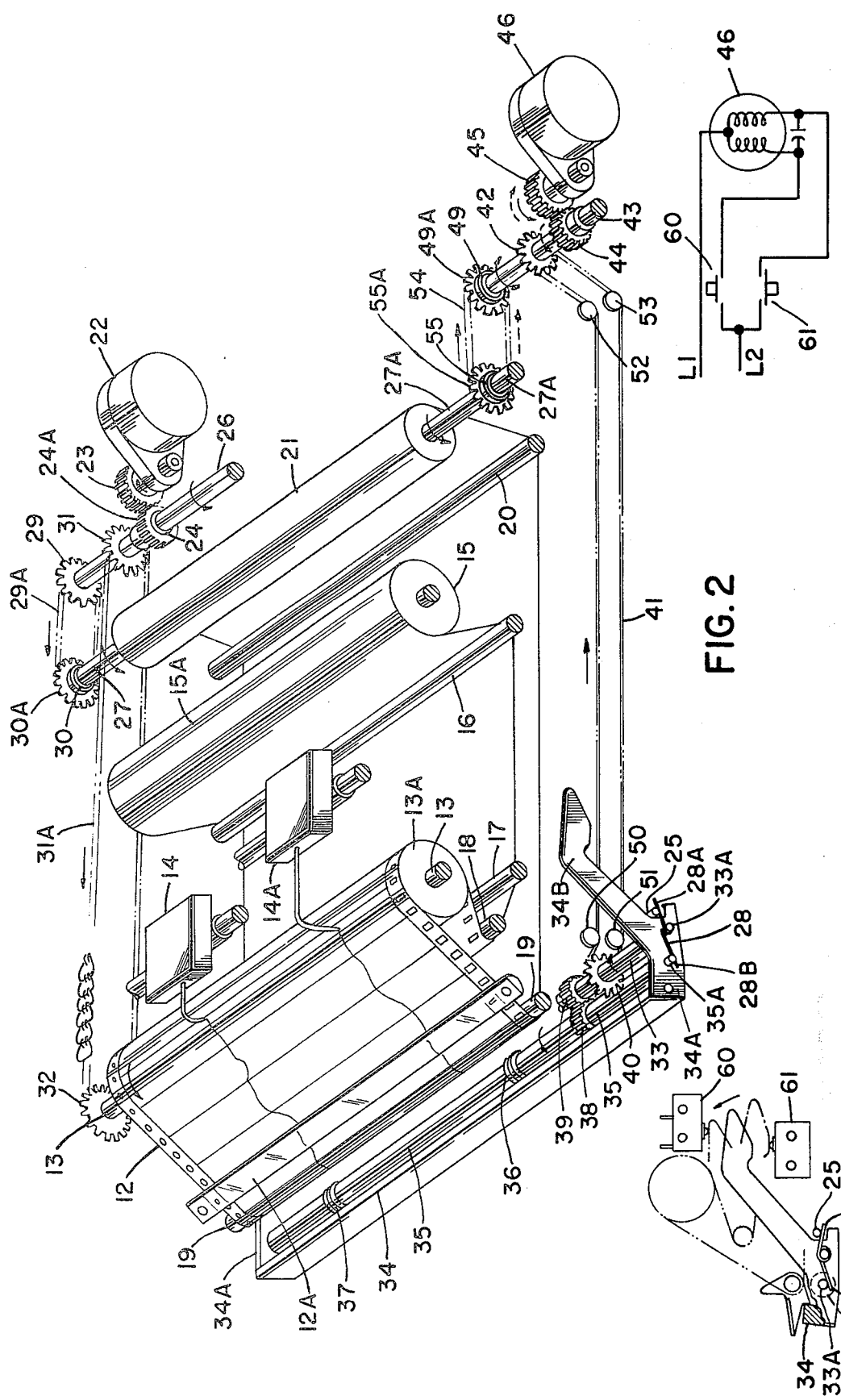

3,889,275

STRIP CHART RECORDER

BACKGROUND OF THE INVENTION

1. Field of the Invention

Applicant's invention relates to strip chart recorders of the type customarily to be found in the Official U.S. Patent Office subclasses relating to Recorders, Record Receivers and/or Driving Means Therefor, Web. However, other Official Patent Office subclasses may be pertinent, for example, such as relate to Electricity, Measuring and Testing, Recording.

2. Description of the Prior Art

For many years it has been customary in the strip chart recording art to provide slip clutches or low torque motors in association with chart reroll mechanisms so that an operator could manually pull a portion of the rewound chart from the reroll for inspection thereof by inserting fingers under each side of the chart and drawing the chart forward. After inspection of the chart the excess pulled from the reroll was rewound by the chart rewind means or as in the case of a device disclosed in U.S. Pat. No. 2,059,879 spring means caused to be tensioned when chart was pulled from the recorder for viewing functioned to rewind the chart when the loop of chart was released. It has been a disadvantage with respect to such manual means for chart inspection that occasionally holes in a chart which cooperate with pins on a chart drive or metering roll would be torn or the chart might be pulled in a manner to force turning of the metering roll, thus getting the chart out of time.

In accordance with applicant's invention the foregoing difficulties are overcome by the provision of means for automatically recovering a portion of chart from the reroll so that a previously recorded record may be reviewed and thereafter automatically returned to the reroll in avoidance of damaging the chart or getting the chart out of its proper time relation with the chart metering roll.

SUMMARY OF THE INVENTION

In accordance with applicant's invention there is provided a strip chart recorder including a supply roll, a chart metering roll, and a reroll comprising chart drive means for driving the chart relative to means for applying a record on the chart, reversible drive means and means associated with the reversible drive means engageable with the chart to effect withdrawal of chart from the reroll on operation of the reversible drive means in one direction and means associated with the reroll for rerolling the chart operable upon operation of the reversible drive means in another direction. There is also included means to render operation of the chart drive means independent of the operation of the reversible drive means.

More specifically, the strip chart recorder includes rotatable frame structure supporting a shaft having secured thereto friction drive means driveable by the reversible drive means. The friction drive means is engageable with the chart to effect removal of chart from the reroll for the production of a loop of chart having material previously recorded thereon accessible for review. It is further specifically an object to render the chart drive means and the reversible drive means independent one with respect to the other by means of a plurality of one way clutches and provide switch actuating means which actuated from a neutral position to a first position effects operation of the reversible drive means in one direction to retrieve chart from the reroll and which when actuated from the neutral position in the opposite direction effects actuation of the reversible drive means to reroll the chart.

It is also an object of applicant's invention to provide a strip chart recorder including a chart supply roll, a chart drive roll, and a chart reroll with a unidirectional drive means for drawing the chart from the supply roll and advancing the chart past means for recording on the chart and winding the chart on the reroll and additionally a reversible drive means operative to rotate means for driving a portion of the chart in a direction opposite the direction in which it is driven by the unidirectional drive means thereby to withdraw chart from the reroll for inspection of records previously recorded thereon and with the reversible drive means having a driving connection with the reroll whereby upon rotation of the reversible drive means in a direction opposite that which results in chart being withdrawn from the reroll to effect rerolling of the chart onto the reroll. More specifically, the strip chart recorder includes frame structure supporting means for driving a portion of the chart in the opposite direction. The frame structure is pivoted for movement from a neutral position in which the reversible drive means is inoperative to a first position effecting engagement between the means for driving a portion of the chart and energization of the reversible motor in a direction whereby chart is withdrawn from the reroll thus presenting an excess amount of chart for inspection of the record previously recorded thereon. Movement of the frame structure to a second position effecting actuation of the reversible drive means in a direction to reroll the chart.

In accordance with applicant's invention a strip chart recorder is provided comprising first chart driving means for moving chart from a chart supply, past means for recording on the chart, and to a means for storing the chart after application of a record thereon and second independently operable chart driving means for moving chart from the means for storing the chart to a location for review of the record thereon and moving the chart from that location back to the means for storing the chart. More specifically, such recorder is provided with independently operable chart driving means including a reversible motor and a three-position control means therefor. The three-position control means in one position effects operation of the motor in a forward direction to move the chart from the means for storing the chart to a location for review of a record on the chart. When the control means is in a second position the reversible motor is inoperable during which time the chart may be inspected. When the control means is in a third position operation of the reversible motor is effected in a reverse direction to move the chart from the location wherein the record thereon may be reviewed to the means for storing the chart. More specifically, the control means includes electric switch means and friction drive means for the chart. The friction drive means is operated by the reversible motor upon rotation in a forward direction and means is provided to actuate said switch means while effecting driving engagement between the friction drive means and the chart of the recorder.

It is further an object of applicant's invention to provide a strip chart recorder having a chart supply roll, a chart drive roll, and a chart reroll, and means for driving the chart drive roll and the chart reroll to effect movement of a chart past recording means for the application of a record on a chart and rerolling of a chart on the reroll. There is also provided a chart drive means and means selectively operable independently of the means for driving the chart drive roll and chart reroll to drive the chart drive means for removal of chart from the reroll and drive the reroll to effect rerolling of a chart thereon.

For a more complete understanding of applicant's invention, the objects, and the advantages obtained by its use the following description and claims should be read with reference to the accompanying drawings.

BRIEF DESCRIPTION OF THE DRAWINGS

FIG. 2 is a somewhat diagrammatic perspective view illustrative of the pertinent parts of the recorder of FIG. 2, FIG. 3 is a side elevation illustrating switch operation of the automatic chart viewing mechanism in accordance with applicant's invention, and FIG. 4 is a wiring diagram showing the circuit connections for operation of the chart viewing mechanism in accordance with applicant's invention.

DETAILED DESCRIPTION OF THE INVENTION

Figure 1:
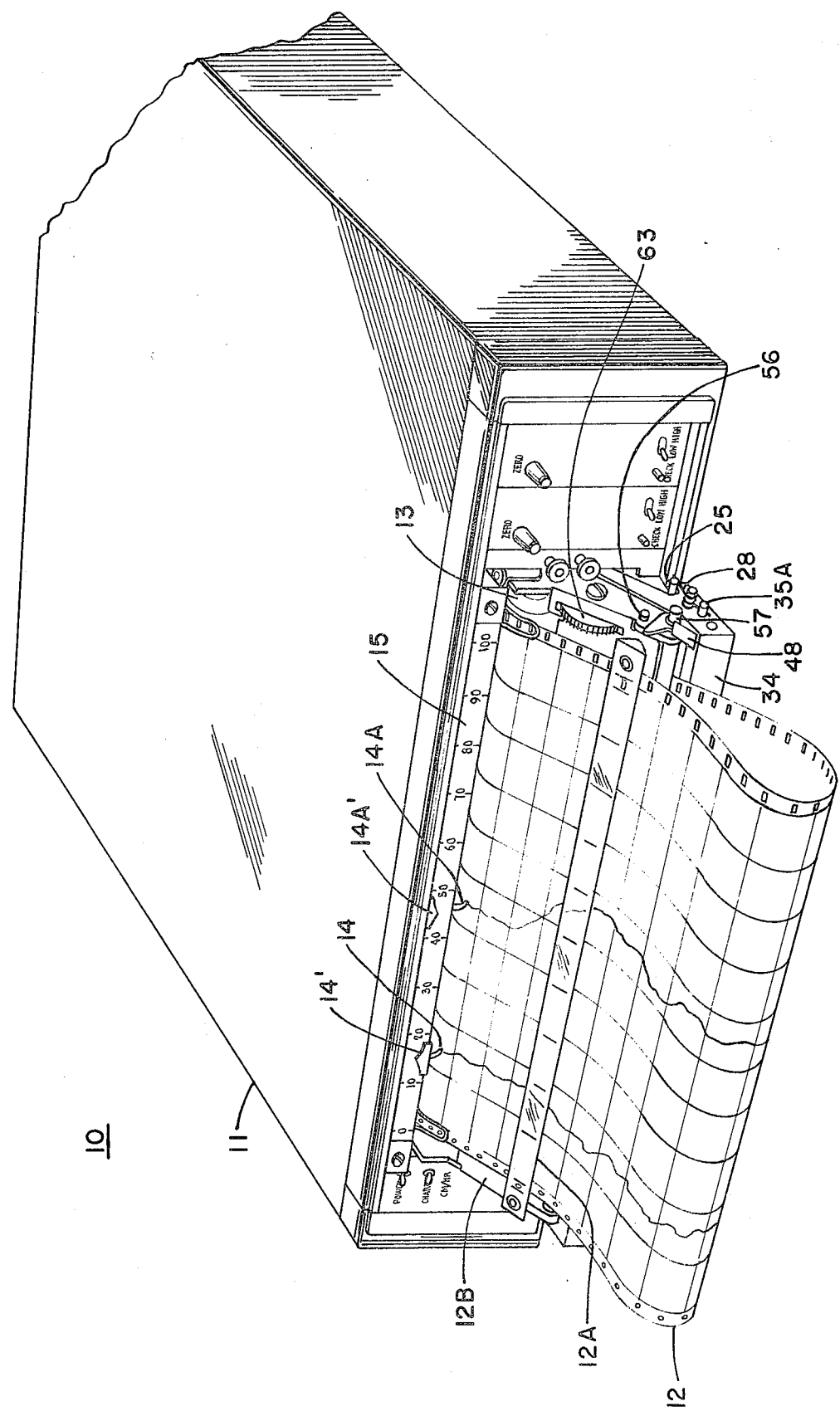
FIG. 1 is a perspective view illustrative of a recorder in accordance with applicant's invention.

In FIG. 1 there is shown a low profile recorder 10 housed in a case 11. The recorder is of the type wherein a chart 12 is drawn from a supply roll, not shown, by means of a metering or chart drive roll 13 past a pair of marking devices 14,14A each having an index 14',14A' respectively associated with a scale 15. A chart tear-off bar 12A is provided not only for the purpose of removing a section of chart if desired but additionally to bias the chart toward a platen 12B in order that the chart may easily be formed into a loop when chart is withdrawn from the reroll for review of the record in a manner to be described.

A thumb wheel 63 is provided for manual adjustment of the chart 12 relative to the marking means 14,14A to synchronize recording with clock time in a manner well understood by those skilled in the art. The recorder additionally includes a bar 34 spring biased upwardly by a spring 28 against a latch 48 constructed in a manner and for a purpose more completely described below to effect presentation of a loop of chart obtained from the chart reroll to permit inspection of the chart record which has passed from view.

In FIG. 2 there are shown the essential parts of the chart drive mechanisms of the recorder of FIG. 1 to the extent required to illustrate applicant's invention. Parts customarily used in strip chart recorders and which are not necessary for an understanding of the invention have been omitted in order to avoid confusion. As will be understood by those skilled in the art bearings not shown for the various shafts, etc. are located in a suitable frame structure and/or in its associated parts.

In FIG. 2 there is shown a shaft 15 supporting a chart supply roll 15A which is freely rotatable on a pair of hubs not shown. There are also shown a first detour rod 16, a second detour rod 17, a third detour rod 18, a chart metering or drive roll 13A secured on a shaft 13, a rotatable detour rod 19, a fourth detour rod 20 and a reroll 21 supported on a pair of hubs not shown. A sprocket wheel 30A is supported on a rotatable shaft 27 through a one-way friction clutch 30 and the shaft 27 supports a hub of the conventional pair of hubs supporting the reroll through a friction clutch. A chart drive of conventional type is disclosed in U.S. Pat. No. 2,074,118. Such drives and modifications thereof utilizing a drive motor, sprocket wheels and chain, chart drive roll and hub mounted supply and rerolls are well known to those skilled in the art, hence a detailed description thereof is not deemed necessary for an understanding of my invention and is omitted to simplify the present description.

In normal operation of the recorder a timing motor 22, rotating clockwise as viewed in FIG. 2, is operative by way of its output gear 23 which is engaged with a gear 24A to drive a shaft 26 counter-clockwise as indicated by the solid line arrow. Gear 24A is mounted on the outer portion of a one-way-drive clutch 24 which for counter-clockwise rotation of gear 24A grabs and drives the shaft 26, however, when shaft 26 is driven in the counter-clockwise direction with respect to gear 24A, as by the thumb wheel 63 of FIG. 1, to set time the clutch will slip. Sprocket wheels 29 and 31, both of which are secured to shaft 26, drive sprocket wheels 30A and 32 respectively by means of sprocket chains 29A and 31A. Sprocket wheel 30A is secured to the outer portion of a one-way-drive clutch 30 which drives shaft 27 when rotating counter-clockwise as shown by the solid line arrow. However, when shaft 27 is driven counter-clockwise by a motor 46 at a speed faster than that of sprocket wheel 30A clutch 30 will slip thus allowing the shaft to rotate without affect on sprocket wheel 30A. The driven sprocket 32 is mounted on shaft 13 which as mentioned above supports the chart drive or metering roll 13A. When the motor 22 is energized the chart metering roll will be rotated in accordance with a function of time to withdraw chart from the chart supply roll 15 and advance the chart past marking means 14,14A. Simultaneously, by way of the drive connection between the motor 22 and the shaft 27 (using sprocket wheels of the proper size) the chart reroll will be rotated through its overdrive clutch (not shown) at a rate somewhat faster than the rate at which the chart is being advanced by the chart metering roll thereby to apply proper tension on the chart as it is being rewound all in a manner well understood by those skilled in the art and which per se is not applicant's invention. For reasons later to be described a second sprocket wheel 55A is affixed to the outer portion of a one-way-drive cllutch 55 journaled on shaft 27A which supports the adjacent hub, not shown, which is keyed to the reroll 21. This clutch slips allowing sprocket wheel 55A to remain stationary when the shaft 27A is rotating counter-clockwise with respect to wheel 55A while chart 12 is being rerolled by motor 22.

Still referring to FIG. 2, when it is desired to review a portion of the chart which is no longer observable there has been provided in accordance with applicant's invention a bar 34 having rearwardly extending side arm portions 34A. These side arm portions together with the bar 34 form a U-shaped frame structure pivoted about ends 33A of an intermediate drive shaft 33 which is journaled for rotation in the recorder frame not shown. A spring 28 having a portion wound about end 33A has an end 28A held by a pin 25 secured in the recorder frame not shown. The other end 28B of spring 28 is secured by a protruding end 35A of shaft 35 in a manner to urge the frame structure comprised of bar 34 and side arm portions 34A in a clockwise direction about the pivot points at 33A, only one of which is shown. The frame structure supports a rotatable shaft 35 having chart driving friction rollers 36,37. As a result of the bias effected by spring 28 shaft 35 with the friction rollers 36 and 37 is urged into engagement with the chart 12 when a latch 48 is disengaged from bar 34.

The near portion 34A affixed to bar 34 includes an extension 34B which functions as an actuator for a pair of switches 60,61, shown only in FIGS. 3 and 4. Secured to the shaft 35 which also supports the friction rollers 36,37 is a spur gear 38 meshed with a spur gear 39 secured to the shaft 33. Shaft 33 additionally has secured thereto a sprocket wheel 40 which is in mesh with a drive chain 41, the other end of the loop of which is in mesh with a sprocket wheel 42 affixed to a jackshaft 43. Rollers 50–53 are provided as guide rollers for the chain 41. The jackshaft 43 additionally has secured thereto a spur gear 44 which is meshed with the output gear 45 of a reversible motor 46. The other end of jackshaft 43 has supported thereon a sprocket wheel 49A affixed to the outer portion of a one-way-drive clutch 49. Clockwise rotation of jackshaft 43 with respect to sprocket wheel 49A results in slippage of clutch 49 so that sprocket wheel 49A is not driven by shaft 43 in a clockwise direction for reasons later set forth.

The sprocket wheel 49A supported on shaft 43 is in mesh with a chain 54, the other end of the loop of which is in mesh with the sprocket wheel 55A mounted on the hub of one-way-drive clutch 55 supported on reroll drive shaft 27A. When motor 46 is deenergized and shaft 27A is rotating counter-clockwise the clutch 55 slips and sprocket wheel 55A remains stationary, as mentioned above.

REferring momentarily to FIG. 3 there are shown switches 60 and 61 positioned relative to the end 34B such that movement of the bar 34 clockwise about the pivot points established by the ends 33A of shaft 33 on which side arm portions 34A are journaled caused switch 61 to be actuated and movement of the bar counter-clockwise about the ends of shaft 33 causes switch 60 to be actuated. Upon release of the latch 48 the spring 28 effects movement of the frame structure comprised of bar 34 and side arms 34A clockwise about 33A and shortly after the switch 61 is actuated the friction rollers 36 and 37, which are secured to shaft 35 carried by the frame structure comprised of bar 34 and side arm portions 34A, are moved into engagement with the chart 12 which is partly wrapped around and backed up by the freely rotatable shaft 19.

FIG. 4 is a wiring diagram showing the connections for motor 46. This motor is powered from any suitable power supply indicated by conductors L1 and L2. The conductor L1 is connected directly to the motor and conductor 12 is connectable to one side of the motor through normally open switch 61 or to the other side of the motor through normally open switch 60 upon closure of one of switches 60,61 respectively. Closure of the normally open switch 61 effects counter-clockwise rotation of motor 46 and closure of normally open switch 60 effects clockwise rotation of motor 46.

Referring now to FIGS. 2 and 3, it may be observed, as has already been explained, that release of the latch 48 permits the spring 28 to rotate the frame structure comprised of bar 34 and arms 34A to rotate clockwise about shaft ends 33A which effects closure of switch 61 and engagement of the friction rollers 36 and 37 with the chart 12. Closure of switch 61 causes motor 46 to rotate counter-clockwise, in the direction of the solid line arrow near the circumference of gear 45. By way of the output gear 45 and gear 44 the jackshaft 43 is caused to turn clockwise as indicated by the arrow associated with shaft 43 to drive sprocket wheel 42 in the clockwise direction and by means of the chain 41 drive sprocket wheel 40 in the clockwise direction. This effects corresponding rotation of gear 39 which is secured, as is sprocket wheel 40, on shaft 33. Clockwise rotation of gear 39 effects counter-clockwise rotation of gear 38 and shaft 35 thus causing the friction rollers 36 and 37 to pull chart from the reroll 21. The chart tear-off bar 12A causes the chart pulled from the reroll to form a loop as shown in FIG. 1, thus presenting a selected portion of the chart upon which a record has been made so that the record may be reviewed. The motor speed and gear and sprocket wheel ratios are such as to effect withdrawal of the chart from reroll 21 at a speed substantially faster than it is being rewound by the recorder reroll mechanism previously described. This is made possible by slippage of the conventional friction clutch normally employed to overdrive the reroll so as to maintain tension on the chart. Slippage of the friction clutch permits chart to be withdrawn from the reroll. The friction clutch slips because the torque of motor 22 and the speed reduction in the gear train in motor 22 prevents back driving by sprocket wheel 30A. Shaft 27A which is keyed to the right hand hub, not shown, of reroll 21 will be driven clockwise as chart is pulled from the reroll. When shaft 27A is rotated clockwise relative to sprocket wheel 55A clutch 55 will grab to drive sprocket wheel 55A and by way of the chain 54 drives sprocket wheel 49A. The speed at which sprocket wheel 49A is being driven clockwise is less than the speed of shaft 43 in view of the fact that the diameters of friction wheels 36 and 37 are always less than the diameter of the reroll, hence clutch 49 will slip so that the clockwise rotation of wheel 49A has no affect on the drive when chart is being pulled from the reroll.

As long as it is desired to obtain chart from the reroll, bar 34 is allowed to remain in its upward position. When the desired amount of chart has been presented for review bar 34 will be pressed downwardly into its latched position thus removing the drive wheels 36,37 from engagement with the chart and opening switch 61 so that motor 46 is deenergized. Upon completion of inspection of the chart it may be caused to be rewound onto the reroll 21 by pushing bar 34 downwardly against the bias of spring 28 far enough to move end 34B upwardly into engagement with the actuator for switch 60 (see FIG. 3) to energize motor 46 for rotation in a clockwise direction.

Clockwise rotation of gear 45 effects counter-clockwise rotation of its mating gear 44 and thus the shaft 43. Counter-clockwise rotation of shaft 43 is operative through clutch 49 to drive sprocket wheel 49A, chain 54, sprocket wheel 55A and one-way-drive clutch 55 to rotate shaft 27A in a counter-clockwise direction rapidly to wind chart on the reroll. The one-way-drive clutch 30 between shaft 27 and sprocket wheel 30A provides slippage between the shaft 27 and sprocket wheel 30A when the shaft is rotated in the counter-clockwise direction thus permitting motor 46 through its drive train to effect rapid rewinding of the chart 12 onto the reroll 21 in a manner which is independent of normal chart drive operation by the timing motor 22. After all of the excess chart has been rewound on the reroll 21 the reroll friction clutch permits slip between the shaft 27 and the reroll 21. The operator may then allow bar 34 to return to its latched position under the bias of spring 28 so that normal operation of the recorder will be resumed. When bar 34 is held downwardly continued rotation of the friction rollers 36 and 37 is without affect since they are disengaged from the chart.

In a modification of subject recorder reduced to practice, commercially available one-way-drive roller clutch assemblies, sprocket wheel and chain drives, and a reversible motor were utilized. However, it is to be clearly understood that other types of one-way-drive clutches, drive means, and motor means may be used. While a specific example of applicant's invention has been used for illustrative purposes it is not intended in any way to limit the scope of applicant's invention as claimed.

What is claimed is:

1. A strip chart recorder comprising unidirectional chart driving means for moving chart from a chart supply, past means for recording on said chart to means for storing said chart after application of a record thereon, and independently operable reversible chart driving means operable in one direction for moving chart from said means for storing said chart to a location for review of said record thereon and operable in a second direction for moving said chart from said location for review back to said means for storing said chart.

2. A strip chart recorder according to claim 1 wherein said independently operable reversible chart driving means includes a reversible motor and three position control means therefor, said three position control means in one position effecting operation of said motor in a forward direction to effect movement of said chart from said means for storing said chart to said location for review, said control means in a second position rendering said reversible motor inoperable, and said control means in a third position effecting operation of said reversible motor in a reverse direction rapidly to effect movement of said chart from said location for review to said means for storing said chart.

3. A strip chart recorder inclduing a supply roll, a chart metering roll, and a reroll comprising chart drive means including a driving connection with said metering roll for driving said chart relative to means for applying a record on said chart and a driving connection with said reroll for rerolling said chart, reversible drive means, means selectively engageable with said chart and having a driving connection with said reversible drive means which when engaged with said chart effects withdrawal of said chart from said reroll upon operation of said reversible drive means in one direction and means including a driving connection between said reversible drive means and said reroll for rerolling said chart at a speed faster than that effected by said chart drive means when said means selectively engageable is disengaged from said chart upon operation of said reversible drive means in another direction, and means in each said driving connection to render operation of said chart drive means and said reversible drive means independent one with respect to the other.

4. A strip chart recoreder in accordance with claim 3 wherein said means selectively engageable includes rotatable frame structure supporting a shaft having secured thereto friction drive means driveable by said reversible drive means, said friction drive means being engageable with said chart to effect removal of said chart from said reroll for the production of a loop of chart having material previously recorded thereon accessible for review.

5. A strip chart recorder according to claim 3 wherein said means in each said driving connection to render operation of said drive means independent one with respect to the other is comprised of a plurality of one-way clutch means.

6. A strip chart recorder according to claim 3 wherein switch actuating means associated with said means selectively engageable with said chart is provided which when actuated from a neutral position to a first position effects operation of said reversible drive means in one direction to retrieve chart from said reroll and which when actuated from said neutral position in the opposite direction effects actuation of said reversible drive means to reroll said chart.

7. A strip chart recorder including a chart supply roll, a chart drive roll, and a chart reroll, unidirectional drive means having driving connections with said chart drive roll and said chart reroll operative to draw chart from said supply roll, advance said chart past means for recording on said chart, and wind said chart on said reoll, reversible drive means having driving connections with means for driving a portion of said chart and said chart reroll operative in one direction to rotate said means for driving a portion of said chart in a direction to drive said chart in a direction opposite the direction in which it is driven by said unidirectional drive means thereby to withdraw chart from said reroll for inspection of records previously recorded thereon, said reversible drive means upon rotation in a direction opposite said one direction effecting rapid reroll of the chart which has been withdrawn for inspection, and means in said driving connections rendering said drive means independent one from the other.

* * * * *